(No Model.)

W. WEAVER.
PIPE COUPLING.

No. 541,908. Patented July 2, 1895.

WITNESSES
Paul W. Stevens
M. C. Hinchcliffe

INVENTOR:
William Weaver,
by Foster, Freeman & Co.
his Attorneys.

UNITED STATES PATENT OFFICE.

WILLIAM WEAVER, OF NORWALK, CONNECTICUT, ASSIGNOR OF FOUR-FIFTHS TO WILLIAM A. CURTIS, DEXTER HITCHCOCK, ARTHUR C. WHEELER, AND CHARLES LAPHAM, OF SAME PLACE.

PIPE-COUPLING.

SPECIFICATION forming part of Letters Patent No. 541,908, dated July 2, 1895.

Application filed November 28, 1893. Serial No. 492,266. (No model.)

*To all whom it may concern:*

Be it known that I, WILLIAM WEAVER, a citizen of the United States, residing at Norwalk, county of Fairfield, and State of Connecticut, have invented certain new and useful Improvements in Pipe-Couplings, of which the following is a specification.

This invention relates to an improvement in automatic pipe couplings.

The object of the invention is to provide a coupling which shall be entirely automatic in its action and one wherein no leakage takes place either when the parts are coupled or uncoupled.

Figure 1:
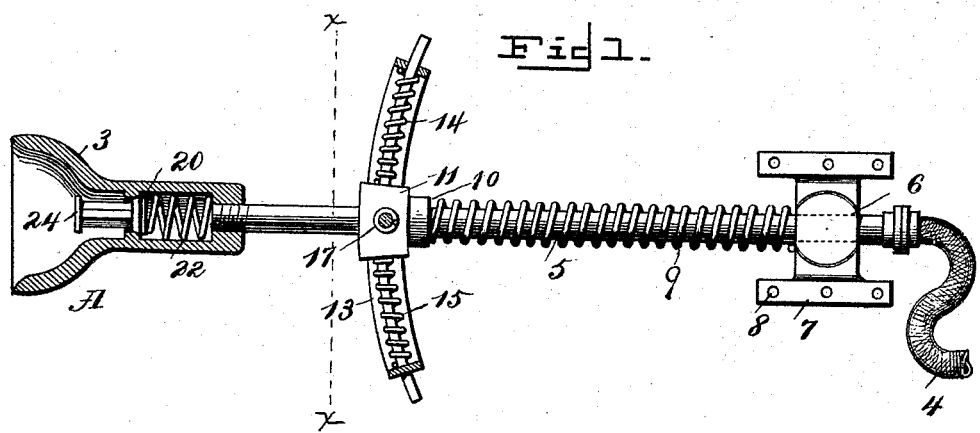
Figure 2:
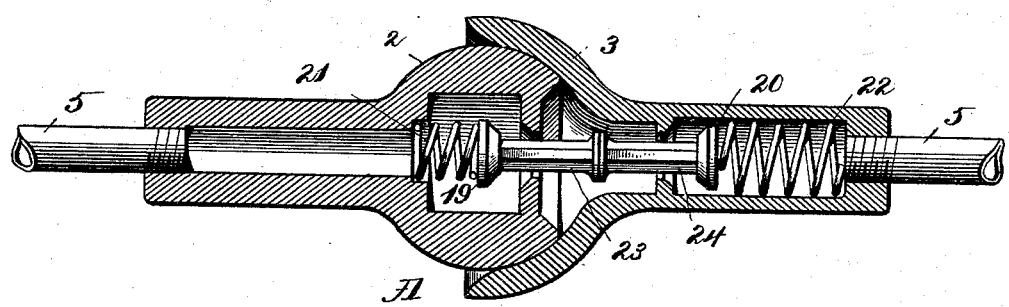
Figure 3:
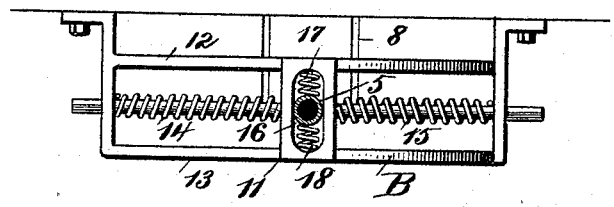

In the accompanying drawings, forming a part of this specification, and in which like letters and numerals of reference indicate corresponding parts, Figure 1 is a plan view of one of the couplers, parts being in section. Fig. 2 is a sectional view, showing the couplers in their coupled position, and Fig. 3 is a cross-sectional view, taken on the lines *x x* of Fig. 1, and illustrating more particularly the frame for supporting the coupling.

In the drawings, A represents the automatic couplings, one section 2 of which is in the form of a sphere or ball, while the other section 3 is in the form of a socket, and each section, instead of being connected directly to one end of a section of a hose pipe 4, is connected to a sliding pipe 5, so supported and mounted beneath the platform of a car that it will slide longitudinally and also have a lateral and vertical play. As shown, the pipe 5 slides in a ball bearing 6 that locks in a stationary bearing or case 7 secured by bolts 8 to the underside of the car. A spring 9 bearing on the shoulder 10 and encircling the pipe 5, tends to throw said pipe outward. The sliding pipe 5 near its outer end passes through a block 11 which slides between guides 12, 13 of a frame B bolted near the front end of the platform of the car, springs 14, 15 on the opposite sides of the block 11 tending to maintain it in a central position. In the block 11 is a slot 16 through which the pipe 5 extends, springs 17 and 18 being arranged in said slot above and below the pipe 5 respectively. When the cars are brought together, so as to bring the sections 2, 3 of the coupling A into contact, the pipe 5 will slide back as far as necessary to permit such contact, and any change in the vertical position of one or the other of said sections 2, 3, will be permitted by the springs 17 and 18, and any change in their lateral position will be permitted by the springs 14 and 15, but said springs will always tend to bring back the pipes 5 to their normal position.

Each section 2, 3, of the coupling A is provided with a valve 19, 20, and each of these valves is provided with springs 21, 22, which tend to throw their respective valves forward so as to close the outer part of said section and prevent the escape of air, steam, &c. Each valve 19, 20, is provided with forwardly projecting stems 23, 24, of such length and in such position that when the two sections 2, 3, are brought together the contact of the two stems will throw both valves inward away from their seats so as to permit a passage from one section of the coupling to the other.

Without limiting myself to the precise construction and arrangement of the particular mechanism set forth, I claim as my invention—

1. In a pipe coupling, the combination of guides, a slotted block adapted to slide laterally upon said guides, a coupler section projected through the slot in said block and adapted to move vertically and horizontally therein, substantially as described.

2. In a pipe coupling, the combination of guides, a slotted block adapted to move upon said guides, a coupler section having its forward end projected through the slot in said block and adapted to move vertically therein, and its rear end projected through a ball bearing, said coupler section being adapted to move horizontally in said slot and ball bearing substantially as and for the purpose set forth.

3. In a pipe coupling, the combination of the frame B, the slotted block 11 supported in and adapted to move laterally in said frame, the springs 14 and 15 arranged respectively upon each side of the block 11, to maintain it in its normal position, a coupler section supported at its rear end in the ball bearing 6 and projecting through the slot in the block 11, and the springs 17, 18 arranged vertically in said slot upon each side of the coupler section, substantially as shown and described.

4. In a pipe coupling, the combination of the frame B, the slotted block 11 supported in and adapted to move laterally in said frame, the springs 14, 15 arranged respectively upon each side of the block 11, to maintain it in its normal position, a coupler section provided with the shoulder 10, supported at its rear end in the ball bearing 6 and projecting through the slot in the block 11, the spring 9 interposed between the shoulder 10 and ball bearing 6, and the springs 17, 18 arranged vertically in the slot of the block 11 upon each side of the coupler section, substantially as described.

5. In a pipe coupling, the combination of two coupling sections in shape of a ball and socket respectively, valves arranged in said sections, each having a forwardly projecting stem adapted to be brought together when the sections are in engagement, suitable guides arranged to the forward ends of the coupler sections, and a slotted block adapted to move laterally upon said guides, the coupler sections being projected through the slots in said block and adapted to move vertically and horizontally therein, substantially as described.

6. In a pipe coupling, the combination of a coupler section supported at its forward end in a slotted block in which it is permitted to move vertically, and at its rear end in a ball bearing through which it passes and is permitted to slide horizontally, and guides in which said slotted block is adapted to move laterally, substantially as described.

7. In a pipe coupling, the combination of two coupling sections in shape of a ball and socket respectively, valves arranged in said sections, each having a forwardly projecting stem adapted to be brought together when the coupling sections are in engagement, slotted blocks for supporting the forward ends of said coupling sections, guides in which said blocks are supported and ball bearings in which the rear ends of the coupling sections are supported, substantially as described.

In testimony whereof I have signed my name to this specification in the presence of two subscribing witnesses.

WILLIAM WEAVER.

Witnesses:
M. C. HINCHCLIFFE,
PAUL W. STEVENS.